Dec. 3, 1968  J. GACHOT  3,413,990
VALVE HAVING A PLUG FITTED WITH A PLASTIC BELLOWS
ELEMENT AND METHOD OF ASSEMBLY THEREOF
Filed March 3, 1967  3 Sheets-Sheet 1

INVENTOR
JEAN GACHOT
By Young + Thompson
ATTYS.

Dec. 3, 1968  J. GACHOT  3,413,990
VALVE HAVING A PLUG FITTED WITH A PLASTIC BELLOWS
ELEMENT AND METHOD OF ASSEMBLY THEREOF
Filed March 3, 1967  3 Sheets-Sheet 2

INVENTOR
JEAN GACHOT
BY Young + Thompson
ATTYS.

United States Patent Office 3,413,990
Patented Dec. 3, 1968

3,413,990
VALVE HAVING A PLUG FITTED WITH A PLASTIC BELLOWS ELEMENT AND METHOD OF ASSEMBLY THEREOF
Jean Gachot, 179 Ave. de la Division Leclerc,
Enghien, Val d'Oise, France
Filed Mar. 3, 1967, Ser. No. 620,328
Claims priority, application France, Mar. 25, 1966, 54,996
6 Claims. (Cl. 137—15)

This invention relates to an improved method of valve assembly and also to a particular valve structure. More specifically, the invention is directed to valves of the type comprising a tubular bellows seal of plastic material which serves to join the sealing plug (which, as a rule, is also made of plastic material) to the stationary body of the valve. The bellows element referred-to is intended to protect the metal operating stem of the valve plug against corrosive fluids which circulate through the valve, thereby making it possible to dispense with the packing gland. In point of fact, the presence of corrosive fluids makes it necessary to employ a valve plug formed of material such as polytetrafluoroethylene, for example, which is inert to aggressive substances. The bellows element can also be fabricated of the same material as the plug. These two parts can even be formed in one piece by machining from the same block, thereby obviating such problems as might otherwise arise if it were necessary to form a strong, leak-tight joint.

In all cases, difficulties are encountered when the terminal portion of the bellows element which is located at the end remote from the valve plug has to be mounted in a leak-tight manner within the valve head.

Such difficulties are aggravated when the joint thus formed must in principle be demountable so as to permit repairs and servicing operations.

The method of assembly and the valve which are contemplated by the invention are both intended to overcome the disadvantages and limitations which have been referred-to.

According to the invention, the method whereby the extremity of a leakproof bellows element which is joined to a valve plug and which surrounds the operating stem of said plug is assembled in leak-tight manner within a valve head is mainly characterized in that the extremity of the bellows element which is remote from said plug is engaged in a valve-head opening of comparable width which terminates in a cavity of larger size, in that there is fitted in the terminal portion of said bellows element a flexible ring which has a greater width than that of the aforesaid opening but the internal diameter of which is smaller than the external diameter of an annular flange formed at that extremity of the bellows element which is remote from the valve plug, and in that there is fitted inside said ring a thick washer formed of several abuttingly assembled components, whereupon the assembly consisting of the terminal portion of the bellows element, the ring and the reconstituted washer is clamped against the bottom of said cavity.

The method additionally makes it possible to form the desired joint without either machining, welding or bonding.

The invention further comprises a valve having a plug fitted with a leakproof bellows element which surrounds the operating stem, and is characterized in that the extremity of said bellows element which is remote from the valve plug is housed in a valve-head cavity having an opening of smaller width through which the bellows element is inserted, the terminal portion of said bellows element being fitted with a ring of greater width in which is housed a washer formed of a number of component parts, the complete assembly being applied against the bottom of said cavity by means of a clamping-plate which is secured to the valve head.

In accordance with a preferred arrangement of the aforesaid valve, the bellows element terminates in an annular flange and the U-section ring is housed between said annular flange and the adjacent fold of the bellows element, the assembly thus formed being applied against the bottom of the cavity by means of at least one annular nut engaged in the valve-head cavity and clamped by means of a clamping-plate which is in turn secured in position by means of tie-bolts.

Further properties and advantages of the invention will become apparent from the description which follows hereinafter.

In the accompanying drawings, which are given solely by way of non-limitative example.

Figure 1:
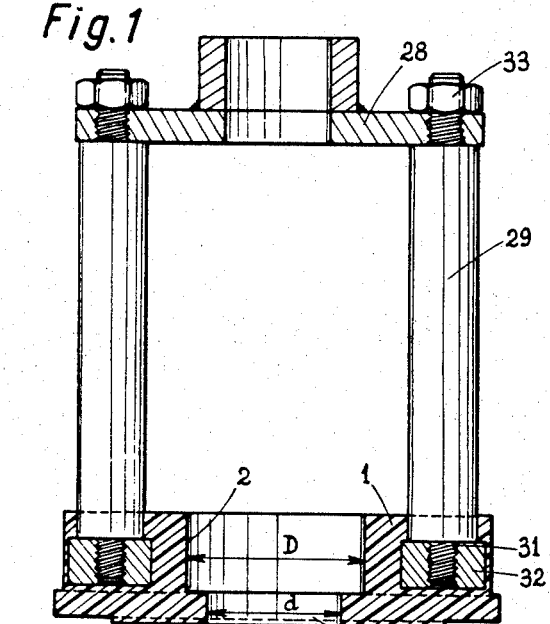
FIG. 1 is an axial sectional view of a valve head prior to assembly.
Figure 2:
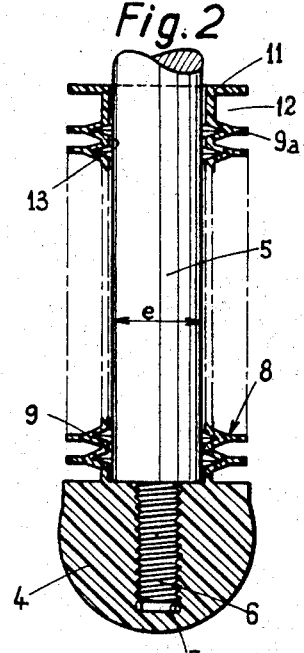
FIG. 2 is a similar view of a valve plug and associated leakproof bellows element which is designed for assembly within the valve head.

Referring now to FIG. 1 of the accompanying drawings, the reference 1 designates a head of plastic material and forming part of a valve which is mainly intended for the passage of corrosive liquids. The valve head 1 may, for example, be of circular shape and is provided with a central cavity 2 having a diameter D and adapted to communicate with an opening 3 having a diameter $d$ which is smaller than the first.

Figure 6:
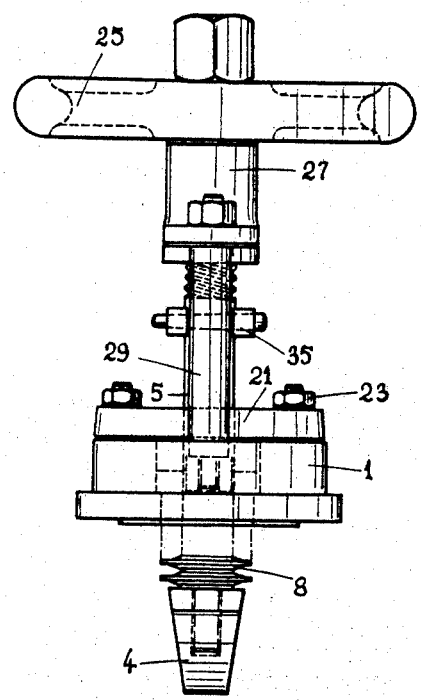
FIG. 6 is a view in side elevation taken along the line VI—VI of FIG. 5.
Figure 8:
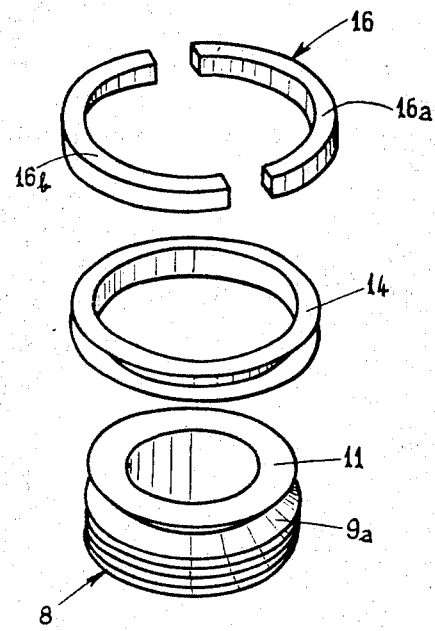
FIG. 8 is an exploded diagrammatic view in perspective showing the sealing members which are associated with the terminal portion of the bellows element.

The valve additionally comprises a plug 4 which is fabricated, for example, of plastic material such as polytetrafluoroethylene, for example, which is inert with respect to aggressive substances. In particular, the valve plug 4 is constituted by a block with bevelled faces, as shown in FIG. 6.

The plug 4 is positionally controlled by a stem 5 terminating in a threaded portion 6 which is screwed into an internally threaded bore 7 formed inside the plug 4. There is fitted around the operating stem 5 a bellows element 8 which comprises a series of folds 9. That extremity of said bellows element which is remote from the plug 4 forms an annular flange 11 and an annular space 12 is provided between the flange 11 and the first fold 9a of the bellows element 8.

Preferably, the bellows element 8 is formed by machining at the same time as the plug 4 and is integral with this latter, thereby solving the problem of providing a seal between these two elements. Preferably also, the external diameter of the folds 9 of the bellows element 8 which corresponds to the diameter of the flange 11 is equal to the diameter $d$ of the opening 3, with due allowance for clearance.

The internal diameter $e$ of the bellows 8 is similarly equal to that of the stem 5 with due allowance for clearance, with the result that the internal zones 13 of the bellows element 8 which are formed between each fold are virtually brought to bear on the stem 5.

The method of assembly which is contemplated by the invention is intended to provide a leak-tight coupling between the bellows element 8 and the head 1. This method consists in starting from the sub-assembly of FIG. 1 and in inserting the bellows element 8 within the opening 3 as shown in FIG. 3, the presence of the stem 5 at this stage being evidently optional.

Figure 3:
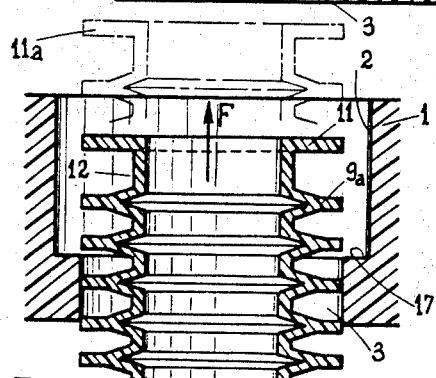
FIG. 3 is an axial view on a larger scale and showing the first stage of execution of the method.

The bellows element 8 is engaged within the cavity 2 and pulled in the direction of the arrow F until the annular flange 11 projects above said cavity and reaches the position 11a which is shown in FIG. 3.

The next step consists in fitting within the annular cavity 12 a ring 14 which has a U-shaped cross-section, for example, and formed in a thin wall of polytetrafluoroethylene. The height of the ring 14 is slightly smaller than the distance between the annular flange 11 and the initial fold 9a of the bellows element. The external diameter of the ring 14 is closely related to the diameter D whilst its internal diameter is smaller than the diameter $d$. Inasmuch as the ring 14 is flexible and can be deformed by bending, said ring can accordingly be passed over the bellows element so as to come into position within the annular space 12.

Figure 4:
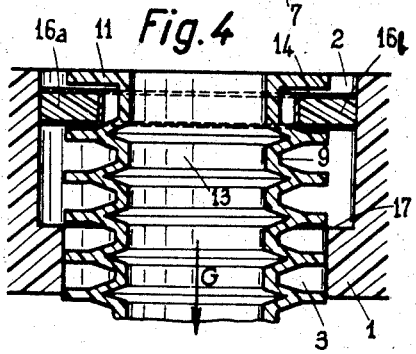
FIG. 4 is a view which is similar to FIG. 3 and showing the final stage of execution of the method.
Figure 5:
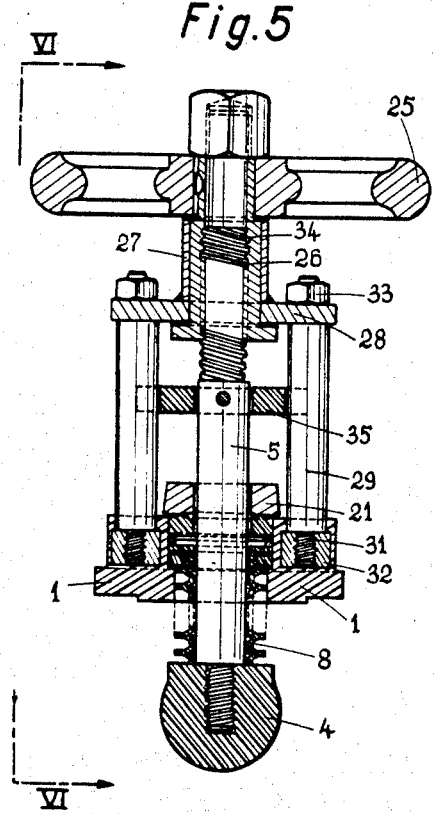
FIG. 5 is an axial sectional view on a smaller scale showing the valve head and associated valve plug after assembly.

At this stage, use is made of a washer 16 formed of two component parts 16a, 16b each extending over a half-circumference; said washer 16 can be fabricated of pressure or alternatively of metal such as stainless steel, for example. The two elements 16a, 16b are fitted inside the ring 14 so as to fill this latter completely. The external diameter of the washer 16 corresponds to that of said ring. The bellows element which is thus equipped with the parts 14 and 16 is then pulled in the direction of the arrow G, as shown in FIG. 4, until the ring 14 is abuttingly applied against the bottom 17 of the cavity 2.

Figure 7:
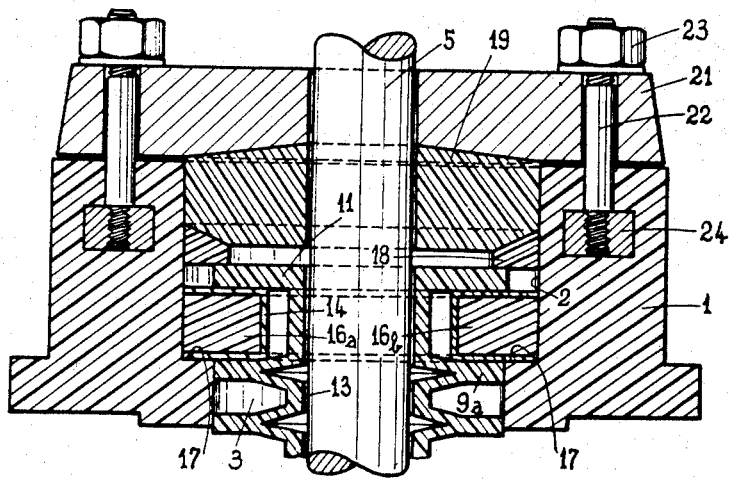
FIG. 7 is an axial sectional view on the same scale as FIG. 3 and 4 and showing both the valve head and the terminal portion of the bellows element after assembly.

It is then merely necessary, should this operation not already have been effected, to insert the stem 5 inside the bellows element 8 by screwing the terminal portion 6 of said stem into the internally threaded portion 7 of the plug. A prismatic washer 18 is then placed on the annular flange 11 and followed by a biconvex nut 19 which is fitted over the stem 5. The washer 18 serves to clamp the edge of the annular flange 11 and the nut 19 serves to close off the cavity 2. The different members are clamped together by means of a plate 21 which conforms to the profile of the nut 19. The clamping-plate 21 is tightened by means of tie-bolts 22 and nuts 23, said tie-bolts 22 being in turn fixed in nuts 24 which are embedded within the valve head 1, as shown in FIG. 7.

The essential valve components are thus assembled. In order to complete the assembly, it is merely necessary to add the operating hand-wheel 25 which is mounted in a sleeve 27, said sleeve being fastened on a yoke 28 which is carried on columns 29. Said columns are provided with threaded ends 31 screwed in nuts 32 which are also embedded in the valve head 1 at right angles to the nuts 24. The yoke 28 is fixed on the columns 29 by means of other nuts 33. The sleeve 26 is screwed onto the threaded end 34 of the operating stem 5 which is secured against rotation by means of a fork 35, the extremities of which are adapted to embrace the columns 29 and to slide along these latter. The assembly of the valve head is thus completed by means of the members last mentioned which are already known per se.

It is clear from the foregoing that the method which is contemplated by the invention and the particular structure of the valve which results therefrom permit of a simple, rapid and economic assembly of the terminal portion of the bellows element 8 within the valve head 1. Assembly and disassembly operations are performed with great ease. Moreover, the means provided ensure total leak-tightness between the bellows element 8 and the valve head 1.

Furthermore, the fact that the bellows element 8 is brought to bear no the body of the valve stem 5 enables said bellows element to withstand high external pressure without incurring any danger of flattening by compression and without entailing in its structural design a thickness of wall which is in any way liable to impair its subsequent capacity for deformation.

It is understood that the invention is not limited to the form of execution herein described and the alternative forms of execution may be considered. In particular, it is apparent that the washer 16 could comprise more than two elements. In addition, the valve plug 4 can have any desired shapes, taking into account the cross-section of the valve body. Finally, it is apparent that the invention is not limited to the particular materials of construction which have been mentioned in the foregoing description solely by way of example.

I claim:

1. A method whereby the extremity of a leakproof bellows element which is joined to a valve plug and which surrounds the operating stem of said valve plug is assembled in leak-tight manner within a valve head, said method comprising engaging the extremity of said bellows element which is remote from said plug into a valve-head opening of comparable width which terminates in a cavity of larger size, fitting in the terminal portion of said bellows element a flexible ring which has a greater width than that of the aforesaid opening but the internal diameter of which is smaller than the external diameter of an annular flange formed at that extremity of said bellows element which is remote from said valve plug, and fitting inside said ring a thick washer formed of several abuttingly assembled components, whereupon the assembly consisting of the terminal portion of said bellows element, said ring and washer is clamped against the bottom of said cavity.

2. A valve having a plug fitted with a leakproof bellows element which surrounds the operating stem wherein the extremity of said bellows element which is remote from the valve plug is housed in a valve-head cavity having an opening of smaller width through which said bellows element is inserted, the terminal portion of said bellows element being fitted with a ring of greater width in which is housed a washer formed of a number of component parts in abutting relation, the complete assembly being applied against the bottom of said cavity by means of a clamping-plate which is secured to said valve head.

3. A valve in accordance with claim 2 wherein said bellows element terminates in an annular flange and wherein said ring has a U-section and is housed between said annular flange and the adjacent fold of said bellows element.

4. A valve in accordance with claim 2 wherein the terminal portion of said bellows element is applied against the bottom of said valve-head cavity by means of an annular nut engaged in said cavity and clamped by means of a clamping-plate which is in turn secured in position by means of tie-bolts.

5. A valve in accordance with claim 2 wherein the internal zones of the bellows element are substantially applied against said operating stem.

6. A valve in accordance with claim 2 wherein said bellows element and said valve plug are formed by machining from a same block of plastic material such as polytetrafluoroethylene which is inert to aggressive substances.

References Cited

UNITED STATES PATENTS

| | | | |
|---|---|---|---|
| 2,514,059 | 7/1950 | Hicks et al. | 92—34 |
| 2,743,738 | 5/1956 | Johnson | 251—335.2 |

FOREIGN PATENTS

| | | |
|---|---|---|
| 505,111 | 12/1954 | Italy. |
| 1,316,620 | 12/1962 | France. |

ARNOLD ROSENTHAL, *Primary Examiner.*